US009100506B2

(12) United States Patent
Chow et al.

(10) Patent No.: US 9,100,506 B2
(45) Date of Patent: Aug. 4, 2015

(54) JOINT SIGNAL PROCESSING ACROSS A PLURALITY OF LINE TERMINATION CARDS

(75) Inventors: Hungkei Chow, Livingston, NJ (US); Adriaan De Lind Van Wijngaarden, New Providence, NJ (US); Michael Peeters, Lint (BE); Dirk Vanderhaegen, Wemmel (BE)

(73) Assignee: Alcatel Lucent, Boulogne-Billancourt (FR)

( * ) Notice: Subject to any disclaimer, the term of this patent is extended or adjusted under 35 U.S.C. 154(b) by 490 days.

(21) Appl. No.: 13/319,248

(22) PCT Filed: Jun. 10, 2010

(86) PCT No.: PCT/EP2010/058125
§ 371 (c)(1),
(2), (4) Date: Nov. 7, 2011

(87) PCT Pub. No.: WO2010/149498
PCT Pub. Date: Dec. 29, 2010

(65) Prior Publication Data
US 2012/0057693 A1 Mar. 8, 2012

(30) Foreign Application Priority Data

Jun. 24, 2009 (EP) .................................... 09290482

(51) Int. Cl.
*H04M 1/76* (2006.01)
*H04M 11/06* (2006.01)
(Continued)

(52) U.S. Cl.
CPC .............. *H04M 11/062* (2013.01); *H04B 3/32* (2013.01); *H04L 25/03343* (2013.01); *H04L 2025/03426* (2013.01)

(58) Field of Classification Search
CPC .......... H04M 9/082; H04M 1/74; H04B 3/20; H04B 3/23; H04B 3/32; H04B 1/7117; H04B 1/7115; H04B 1/64; H04L 27/2647; H04L 25/03057; H04L 5/0007; H04J 3/00
USPC ....................... 379/406.01–406.16, 417, 416; 370/201–206; 375/144, 148, 346, 348
See application file for complete search history.

(56) References Cited

U.S. PATENT DOCUMENTS 6,314,102 B1    11/2001   Czerwiec et al.
2001/0048679 A1  12/2001   Czerwiec et al.
(Continued)

FOREIGN PATENT DOCUMENTS

CN      101453245 A    6/2009
EP       0891067 A2    1/1999
EP       2107692 A1   10/2009

OTHER PUBLICATIONS

Nghi, H Tran et al: "Bit-Interleaved Coded OFDM With Signal Space Diversity: Subcarrier Grouping and Rotation Matrix Design" (XP011165456).

*Primary Examiner* — Akelaw Teshale
(74) *Attorney, Agent, or Firm* — Harness, Dickey & Pierce, P.L.C.

(57) ABSTRACT

In one embodiment, the line termination card includes a data output terminal configured to output a data sequence. The card further includes a vectoring entity configured to parse and encode the data sequence into frequency samples according to a carrier loading parameter, configured to scale the frequency samples into scaled frequency samples according to a carrier scaling parameter, and, configured to process the scaled frequency samples for crosstalk compensation. A controller is configured to adjust the carrier loading parameter and the carrier scaling parameter, and a forwarder is coupled to the data output terminal and to the controller. The forwarder is configured to forward the data sequence, the carrier loading parameter and the carrier scaling parameter towards a further line termination card.

10 Claims, 3 Drawing Sheets

Figure 1:
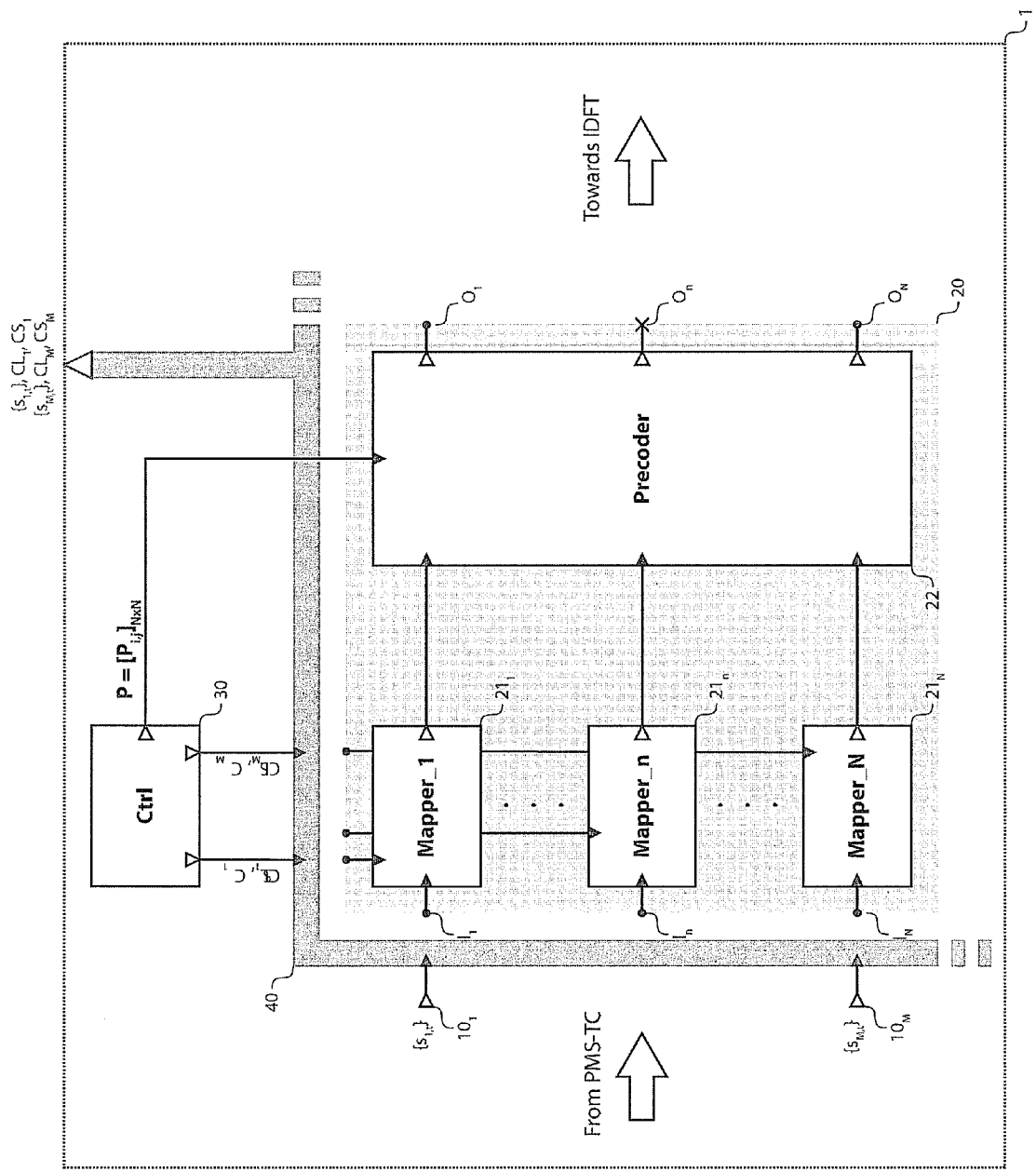

(51) Int. Cl.
  *H04B 3/32* (2006.01)
  *H04L 25/03* (2006.01)

(56) References Cited

U.S. PATENT DOCUMENTS

| | | |
|---|---|---|
| 2002/0012354 A1 | 1/2002 | Czerwiec et al. |
| 2002/0012355 A1 | 1/2002 | Czerwiec et al. |
| 2002/0015412 A1 | 2/2002 | Czerwiec et al. |
| 2002/0031116 A1 | 3/2002 | Czerwiec et al. |
| 2002/0044525 A1 | 4/2002 | Czerwiec et al. |
| 2003/0086362 A1 | 5/2003 | Hasegawa et al. |
| 2003/0112858 A1* | 6/2003 | Wang ............ 375/222 |
| 2008/0285740 A1* | 11/2008 | Schelstraete et al. .... 379/406.06 |
| 2009/0296792 A1 | 12/2009 | Fang |
| 2011/0142111 A1* | 6/2011 | Sands et al. ............ 375/222 |

* cited by examiner

JOINT SIGNAL PROCESSING ACROSS A PLURALITY OF LINE TERMINATION CARDS

The present invention relates to joint signal processing for crosstalk compensation, and more specifically to a line termination card for connecting subscriber devices through subscriber lines, and operable to compensate for the induced crosstalk.

Crosstalk (or inter-channel interference) is a major source of channel impairment for multiple Input multiple output (MIMO) communication systems, such as Digital subscriber Line (DSL) communication systems.

As the demand for higher data rates increases, DSL systems are evolving toward higher frequency bands, wherein crosstalk between neighboring transmission lines (that is to say, transmission lines that are in close vicinity such as twisted copper pairs within a cable binder) is more pronounced (the higher frequency, the more coupling).

A MIMO system can be described by the following linear model:

$$Y(f) = H(f) \times (f) + Z(f) \quad (1)$$

wherein the N-component complex vector X, respectively Y, denotes a discrete frequency representation of the symbols transmitted over, respectively received from, the N channels, wherein the N-component complex vector Z denotes additional noise present over the N channels, such as alien interference, thermal noise and Radio Frequency Interference (RFI), and wherein the N×N complex matrix H is referred to as the channel matrix. The (i,j)-th component of the channel matrix H describes how the communication system produces a signal on the i-th channel output in response to a symbol being transmitted to the j-th channel input. The diagonal elements of the channel matrix describe direct channel coupling, and the off-diagonal elements of the channel matrix describe inter-channel coupling.

Different strategies have been developed to mitigate crosstalk and to maximize effective throughput, reach and line stability. These techniques are gradually evolving from static or dynamic spectral management techniques to multi-user signal coordination, One technique for reducing inter-channel interference is joint signal precoding, with precoding, signals are passed together through a precoding matrix before being transmitted over the respective communication channels. The precoding matrix is such that the concatenation of the precoder and the communication channel results in little or no interference at the receivers.

However, a typical DSL deployment practice is to choose termination ports in a random or first-come-first-serve fashion. In most situations, subscriber lines sharing the same cable binder may not be terminated at the same line termination card. This makes crosstalk compensation operations complicated, ineffective, or even impossible.

A known solution to this problem is to rearrange subscriber lines. Two known solutions are (1) to manually rearrange (or groom) subscriber lines in the field, so that all lines sharing the same binder are properly terminated at the same line termination card; and (2) to employ a sophisticated cross-connect device between the subscriber lines and line termination ports, so that the subscriber lines to termination ports mapping are properly managed. Solution (1) involves dispatching a technician in the field to reconfigure the wiring. Not only is this truck roll a costly operation, but it also takes considerable time to complete the process. Solution (2) requires a high quality cross-connect device. This technology is, as of today, still immature. It is either very expensive or introduces too much signal distortion, thus limiting or even eliminating the expected gains of crosstalk compensation.

It is an object of the present invention to efficiently and inexpensively perform crosstalk compensation on a selected group of subscriber lines that are terminated at different line termination cards.

In accordance with a first embodiment of the invention, a line termination card for connecting subscriber devices through subscriber lines comprises:
  a data output terminal for outputting a data sequence,
  a vectoring entity for parsing and encoding said data sequence into frequency samples according to a carrier loading parameter, for scaling said frequency samples into scaled frequency samples according to a carrier scaling parameter, and for processing said scaled frequency samples for crosstalk compensation,
  a controller for adjusting said carrier loading parameter and said carrier scaling parameter,
  a forwarder coupled to said data output terminal and to said controller for forwarding said data sequence, said carrier loading parameter and said carrier scaling parameter towards a further line termination card.

In accordance with another embodiment of the invention, said vectoring entity is for further parsing and encoding a further data sequence into further frequency samples according to a further carrier loading parameter, for scaling said further frequency samples into further scaled frequency samples according to a further carrier scaling parameter, and for processing said further scaled frequency samples for crosstalk compensation, and the line termination card further comprises a further forwarder coupled to said vectoring entity for receiving said further data sequence, said further carrier loading parameter and said further carrier scaling parameter from said further line termination card.

The mappers and the precoder are merged into a single entity, herein named a vectoring Entity (VE), and there are as many VEs per line termination card as there are groups of signals to be jointly processed (or crosstalk compensation groups, or vectoring groups, or precoding groups) on that line termination card. The unmapped data sequences are fed into the respective VEs according to their membership of a crosstalk compensation group. The data output terminals are coupled to the VE(s) through a forwarder. The forwarder selectively duplicates and transmits the data sequences to a collection of line termination cards, which perform joint signal processing on line signals of the same crosstalk compensation group.

The carrier loading and scaling parameters are also forwarded so as the data sequences are correctly mapped into the frequency domain for accurate crosstalk compensation.

This innovative architecture greatly reduces the required communication throughput between line termination cards (e.g., if complex values at the output of the mappers, quantized with a sufficient number of bits, were to be supplied to a centralized precoder for further precoding; and still one may suffer some quantization loss), making that solution nearly optimal.

This is achieved by grouping the mappers and the precoder into one single entity, and inputting that entity with locally available data sequences, as well as with data sequences from further line termination cards.

The same VE (that is to say, making use of the same precoding matrix or related to the same crosstalk compensation group) being duplicated over multiple line termination cards, the data sequences and related mapping information need only be forwarded once (e.g., whereas complex values before and after precoding would have to be exchanged back and forth with one centralized precoder).

Further advantages of this solution are:

It simplifies line management, which can be fully automated.

It improves system performance by allowing a wider selection of crosstalkers, not limited to within a single line card.

It requires no additional equipment in the field and therefore presents no single point of failure.

It requires no "truck roll" upon user subscription changes, which significantly reduces OPEC and improves customer satisfaction.

It offers additional flexibility in network deployment and eases re-configuration in case of network failure.

The data sequence as outputted by the data output terminal may refer for instance to the framed data as outputted by the Physical media specific—Transmission convergence (PMD-TC) layer at the δ reference point in the VDSL2 reference model, described in G.993.2 recommendation entitled "very High speed Digital subscriber Line Transceivers 2 (VDSL2)", published by the International Telecommunication union (ITU) in February, 2006.

If crosstalk compensation is carried out on a subset of tones only (e.g., higher frequency bands only), then the part of the data sequence that is mapped on these tones is forwarded, while the remaining part is not.

The carrier loading parameter may refer for instance to bit loading information such as determined during the initialization or operation of a data communication path over a subscriber line based on the measured signal-to-Noise Ratio (SNR), or may refer to a carrier (or tone) ordering table, whereby carriers are sorted for mapping according to the measured noise and/or further criteria.

The carrier scaling parameter may refer for instance to relative carrier gains as determined during the initialization or operation of a data communication path over a subscriber line based on the measured signal-to-Noise Ratio (SNR), or may refer to a transmit power spectral mask as configured over a subscriber line.

In accordance with another embodiment of the invention, said data sequence (or a part thereof) is multicast based on its membership of a crosstalk compensation group.

crosstalk compensation groups and multicast groups are in one-to-one relationships, and a line termination card subscribes to the appropriate multicast groups so as to be supplied with any data sequence to be jointly processed with the locally available data sequences.

Alternatively, the data sequence is unicast to the appropriate line termination cards, or broadcast to all the line termination cards.

The related carrier loading and scaling parameters can be advertised together with the data sequence as part of the same multicast or broadcast stream, or sent apart through a dedicated channel.

The line termination card may form part of an access node, such as a Digital subscriber Line Access Multiplexer (DSLAM), being located at a central location or at a remote location closer to subscriber premises.

The present invention also relates to a method for connecting subscriber devices through subscriber lines.

In accordance with the first embodiment of the invention, the method comprises the steps of, by a line termination card:

outputting a data sequence, parsing and encoding said data sequence into frequency samples according to a carrier loading parameter, scaling said frequency samples into scaled frequency samples according to a carrier scaling parameter, processing said scaled frequency samples for crosstalk compensation, adjusting said carrier loading parameter and said carrier scaling parameter, forwarding said data sequence, said carrier loading parameter and said carrier scaling parameter towards a further line termination card.

Embodiments of a method according to the invention correspond with the embodiments of a line termination card according to the invention.

Figure 2:
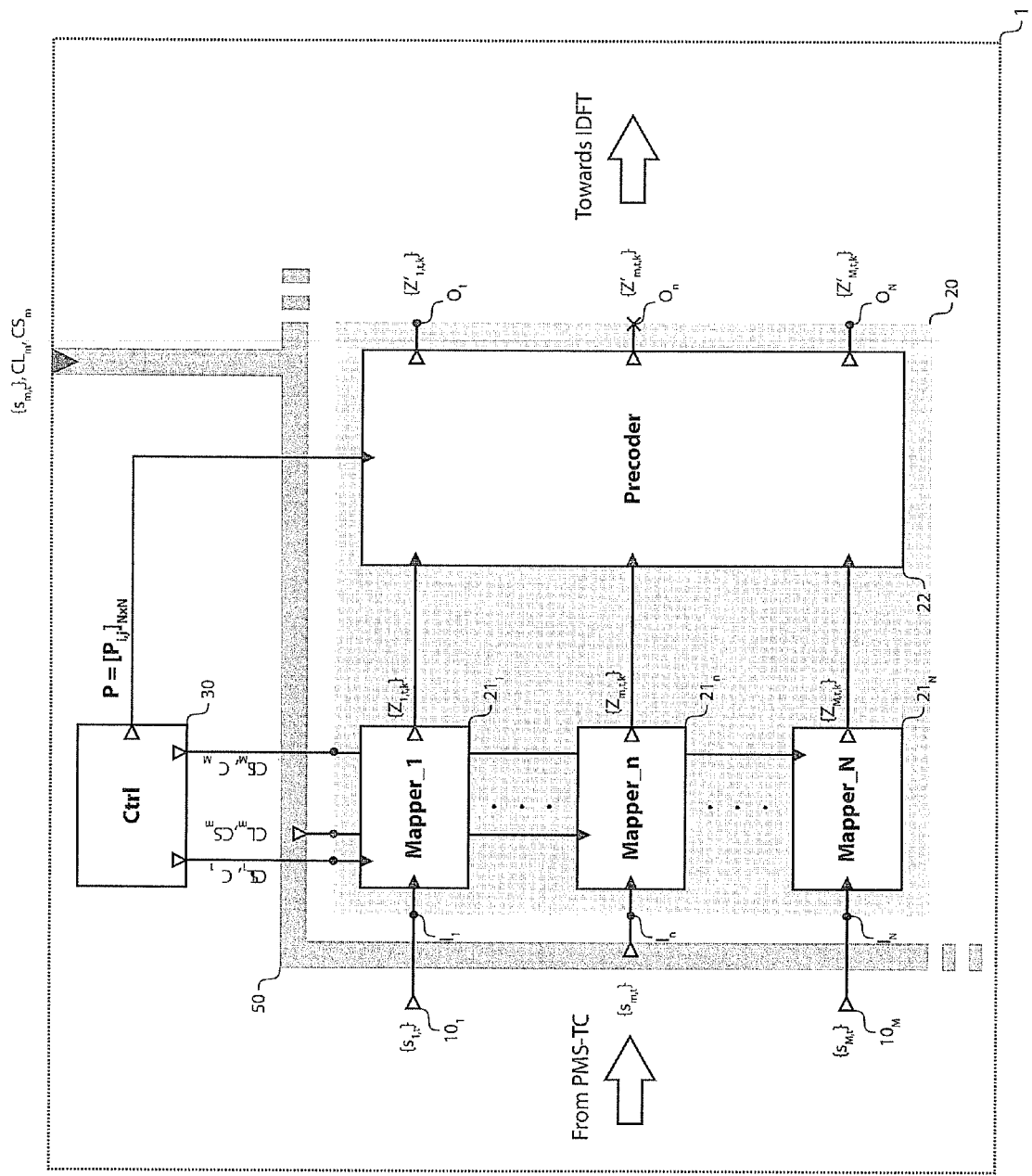
Figure 3:
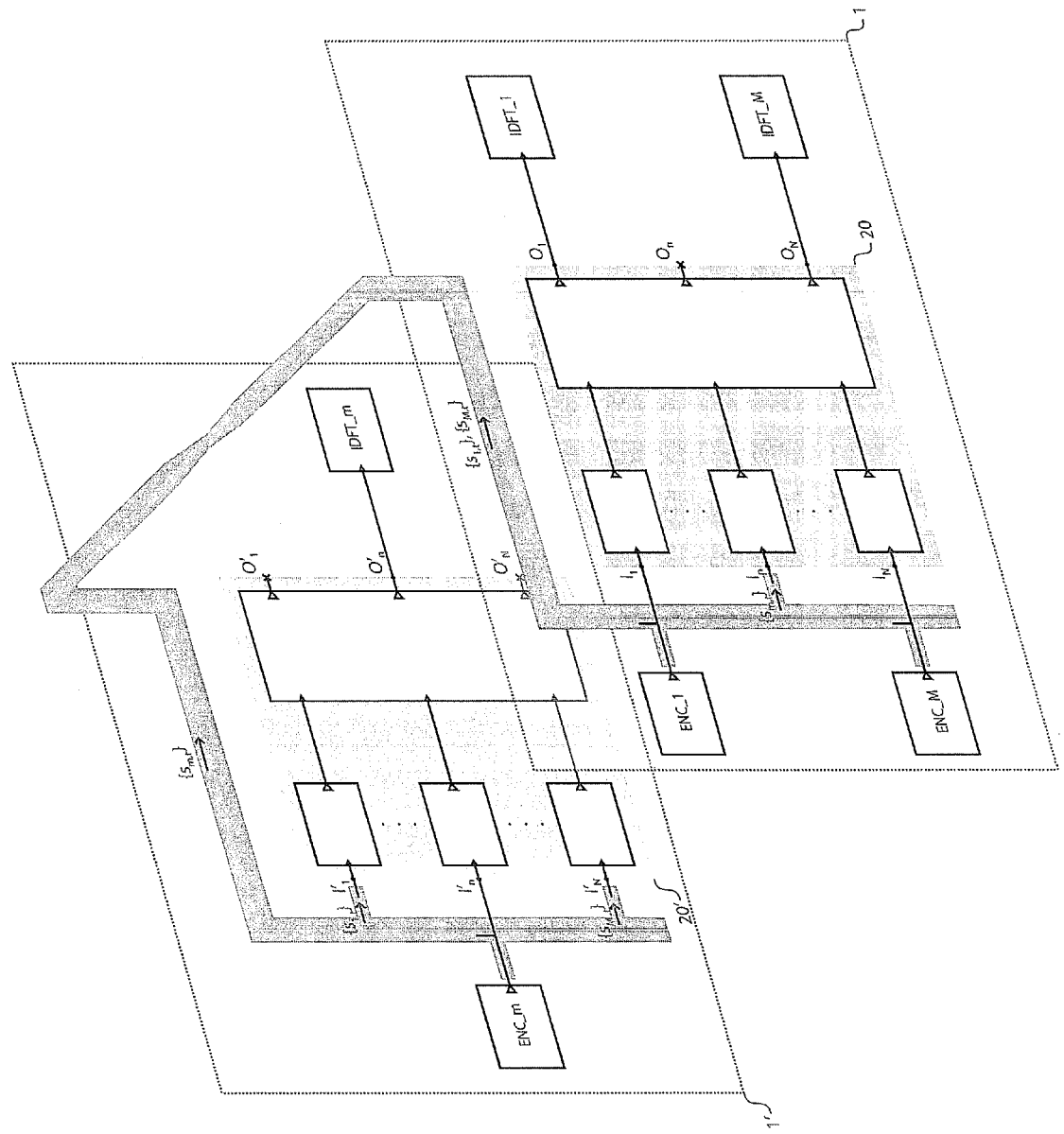

The above and other objects and features of the invention will become more apparent and the invention itself will be best understood by referring to the following description of an embodiment taken in conjunction with the accompanying drawings wherein:

FIG. 1 represents a line termination card in an illustrative embodiment of the invention with emphasis on the outgoing data flows towards a further line termination card, FIG. 2 represents the line termination card with emphasis on the incoming data flows from the further line termination card, FIG. 3 represents an overview of the data flows between the line termination card and the further line termination card.

There is seen in FIG. 1 and FIG. 2 a line termination card 1 with emphasis on the outgoing and incoming data flows respectively.

The input terminals are drawn as solid triangles, whereas the output terminals are drawn as hollow triangles. A terminal is herein meant to be a means for passing information or signal from one hardware or software entity to another, being one or more hardware pins, a function or procedure call, an Application Programming Interface (API), a Remote Procedure call (RPC), etc.

In a preferred embodiment of the invention, the line termination card 1 is operable to terminate VDSL2 subscriber lines, and it forms part of a DSLAM.

The line termination card 1 comprises functional blocks, the most noticeable of which are:

data output terminals 10 for outputting data sequences, a VE 20 comprising N input terminals $I_1$ to $I_N$, and N output terminals $O_1$ to $O_N$, a controller 30, a first forwarder 40, a second forwarder 50.

One or more data output terminals 10 are coupled to input terminals of the VE 20 depending on their group membership. The one or more data output terminals 10 are also coupled to input terminals of the first forwarder 40 for outputting data sequences towards one or more further line termination cards. One or more output terminals of the second forwarder 50 are coupled to input terminals of the VE 20 for inputting data sequences from one or more further line termination cards into the VE 20. Eventually, the controller 30 is coupled to the VE 20 and to the first forwarder 40.

The VE 20 further comprises:

N mappers $21_1$ to $21_N$, and a precoder 22.

The input terminals $I_1$ to $I_N$ are coupled to respective ones of input terminals of the mappers $21_1$ to $21_N$, output terminals of the mappers $21_1$ to $21_N$ are coupled to respective ones of N input terminals of the precoder 22, and N output terminals of the precoder 22 are coupled to respective ones of the output terminals $O_1$ to $O_N$.

One or more control output terminals of the controller 30 are coupled to control input terminals of the mappers 21, and also to input terminals of the first forwarder 40. one or more output terminals of the second forwarder 50 are coupled to control input terminals of the mappers 21. A control output terminal of the controller 30 is further coupled to a control input terminal of the precoder 22.

The couplings between the data output terminals 10 and the input terminals of the mappers 21, between the control output terminals of the controller 30 and the control input terminals of the mappers 21, between the data output terminals 10 and the input terminals of the first forwarder 40, between the control output terminals of the controller 30 and the input terminals of the first forwarder 40, and between the output terminals of the second forwarder 50 and the input terminals and the control input terminals of the mappers 21 depends on the respective memberships of the crosstalk compensation groups, as it will be set forth further in the description.

The data output terminals 10 are adapted to output data sequences that are ready for mapping into the frequency domain. A data sequence herein refers to framed data as outputted by a PMD-TC layer at the δ reference point in the VDSL2 reference model. Each data frame of the data sequence corresponds to one DMT symbol.

The mappers 21 consist of the following functions:
tone ordering,
optionally, trellis coding,
constellation mapping,
constellation point scaling.

The mappers 21 divide the incoming bit stream into small groups of bits, where each group is assigned to modulate a specific carrier of the DMT symbol. Each group is further encoded by the trellis encoder optionally, and eventually mapped to a constellation point in a constellation grid.

During initialization, the receive PMD function shall calculate the numbers of bits (or bit loading) $b_k$ and the relative gains $g_k$ to be used for every carrier k in the MEDLEY set, based on the measured SNR of the carrier and specific system configuration settings. The receive PMD function shall also determine the tone ordering table, that is to say the order in which the carriers are assigned bits. The calculated bits and gains and the tone ordering table shall be sent back to the transmit PMD function during the channel Analysis & Exchange phase of the DSL path initialization.

Constellation points shall be scaled to normalize their average power, to achieve a frequency-dependent transmit PSD, and to equalize the SNR margin over the carriers in use.

The scaling required to normalize the average power is dependent only on the size of the constellation. It is represented by the factor $\chi(b_k)$. The gain adjuster $g_k$ is used to equalize the SNR margin over the carriers in use. The PSD shaping mechanism is based on the so-called $tss_k$ coefficients.

For carriers in the MEDLEY set, each constellation point $(X_k, Y_k)$, corresponding to the complex value $X_k+jY_k$ at the output of the constellation mapper, shall be scaled by the power-normalization factor $\chi(b_k)$, the gain adjuster $g_k$, and a frequency-domain spectrum shaping coefficient $tss_k$ to result in a complex number $Z_k$, defined as:

$$Z_k = g_k \lambda tss_k \lambda \chi(b_k) \lambda (X_k+jY_k) \tag{2}$$

The precoder 22 is adapted to perform joint signal processing in the downstream direction (i.e., from the central office towards the subscriber premises).

Signal precoding is achieved by jointly processing the transmitted symbols in the frequency domain so as to compensate for inter-channel interference.

The downstream channel matrix can be expressed as:

$$H = \begin{bmatrix} H_{11} & H_{12} & \ldots & H_{1n} \\ H_{21} & H_{22} & & \vdots \\ \vdots & & & H_{n-1n} \\ H_{n1} & \ldots & H_{nn-1} & H_{nn} \end{bmatrix} \tag{3}$$

$$= \begin{bmatrix} H_{11} & 0 & \ldots & 0 \\ 0 & H_{22} & & \vdots \\ \vdots & & & 0 \\ 0 & \ldots & 0 & H_{nn} \end{bmatrix} + \begin{bmatrix} 0 & H_{12} & \ldots & H_{1n} \\ H_{21} & 0 & & \vdots \\ \vdots & & & H_{n-1n} \\ H_{n1} & \ldots & H_{nn-1} & 0 \end{bmatrix}$$

$$H = D + C = D(I + D^{-1}C)$$

wherein D denotes the diagonal matrix that contains the downstream direct channel transfer functions, C denotes the off-diagonal matrix that contains the downstream crosstalk channel transfer functions, and I is the identity matrix given by:

$$I = \begin{bmatrix} 1 & 0 & \ldots & 0 \\ 0 & 1 & & \vdots \\ \vdots & & & 0 \\ 0 & \ldots & 0 & 1 \end{bmatrix} \tag{4}$$

Precoding should ideally result in a transfer function matrix that preserves the direct channel transfer functions (frequency equalization at the receive-end compensates for the direct channel attenuation and phase shift) and simultaneously zeroes all the crosstalk channel transfer functions. This is achieved by using the following precoding matrix:

$$P = (I+D^{-1}C)^{-1} \approx I - D^{-1}C \tag{5}$$

The latter is a first order approximation that is valid if the amplitude of the crosstalk channel coefficients is small with respect to the amplitude of the direct channel coefficients, which is a valid assumption in DSL deployments.

Let us denote the relative crosstalk channel matrix as $\tilde{C}$. $\tilde{C}$ is given by:

$$\tilde{C} = D^{-1}C \tag{6}$$

$$= \begin{bmatrix} 0 & H_{12}/H_{11} & \ldots & H_{1n}/H_{11} \\ H_{21}/H_{22} & 0 & & \vdots \\ \vdots & & & H_{n-1n}/H_{n-1n-1} \\ H_{n1}/H_{nn} & \ldots & H_{nn-1}/H_{nn} & 0 \end{bmatrix}$$

The received signal with precoding is then given by:

$$Y' = HPX + Z = D(I+\tilde{C})(I-\tilde{C})X + Z = D(I-\tilde{C}^2)X + Z \approx DX + Z \tag{7}$$

That is to say, with precoding, the received signals are not impaired by inter-channel interference but only by alien noise.

Eventually, the precoded frequency samples modulate the carriers of the DMT symbol using an Inverse Discrete Fourier Transform (IDFT). After the IDFT, the resulting symbol is cyclically extended and windowed, converted into an analog signal and sent through the transmission medium.

The controller 30 is adapted to control the operation of the mappers 21 and the precoder 22, more specifically, the controller 30 passes PMD communication parameters, and more noticeably carrier loading and scaling parameters, to the mappers 21, and a precoding matrix to the precoder 22.

Carrier loading and scaling parameters for lines that terminate on the line termination card 1 are made available by the controller 30, whereas carrier loading and scaling parameters for lines that terminate on a further line termination card are retrieved from the further line termination card through the second forwarder 50.

Carrier loading parameters herein refer to bit loadings $b_k$ and a tone ordering table as determined by the PMD layer. Carrier scaling parameters herein refer to relative carrier gains $g_k$ as determined by the PMD layer, and possibly to a transmit power shaping mask (i.e., the $tss_k$ coefficients) as configured over a subscriber line.

The precoding matrix is determined according to estimates of the crosstalk channel transfer functions. The estimates are computed based on noise measurements from a subscriber device.

The first forwarder 40 is adapted to supply further line termination cards with data sequences as outputted by the data output terminals 10, as well as with the related carrier loading and scaling parameters, for joint signal processing by the further line termination cards.

The second forwarder 50 is adapted to receive data sequences, as well as the related carrier loading and scaling parameters, from a further line termination card for joint signal processing by the VE 20.

An output terminal of the first forwarder 40 is coupled to an input terminal of a further second forwarder forming part of a further line termination card, and an input terminal of the second forwarder 50 is coupled to an output terminal of a further first forwarder forming part of a further line termination card.

The first forwarder 40 and the second forwarder 50 are built upon a communication facility, such as an Ethernet switch fabric or a shared data bus or alike, that connects the line termination cards to each other.

One or more data frames within the data sequences as outputted by the data output terminals 10 are encapsulated into a format appropriate for further transmission towards one or more further line termination cards, e.g. by appending a destination and source address identifying a source and destination line termination card respectively, or by appending a multicast address identifying a particular crosstalk compensation group which the corresponding line termination cards shall listen to. The one or more data frames are next extracted thereat, and further fed into a VE. Each data frame is identified by a DMT symbol index, and by a line identifier to which the data frame relates.

Whereas data sequences are continuously duplicated and fed into the respective VEs, the carrier loading and scaling parameters are only exchanged when their value is adjusted, being upon initialization or by means of On-Line Reconfiguration (OLR) commands.

An operation of this preferred embodiment now follows with regard to FIGS. 1, 2 and 3.

An encoded data sequence is denoted as $\{s_{m,t}\}$ wherein m denotes a data output terminal index ranging from 1 to M with M being lower than or equal to N, and t denotes a DMT symbol index. After constellation mapping and scaling, this data sequence yields a sequence of complex numbers $\{Z_{m,t,k}\}$, which represent the frequency samples of the signal before precoding. The sequence of complex numbers $\{Z_{m,t,k}\}$ is then passed through the precoder 22 for crosstalk pre-compensation, thereby yielding a new sequence of complex numbers $\{Z'_{m,t,k}\}$, which represents the frequency samples of the signal after precoding and before modulation by an IDFT unit.

The scaling factors could be directly integrated into the precoder matrix's coefficients, so as to reduce the number of required arithmetic operations and the quantization loss, in which case the unscaled frequency samples are directly passed to the precoder 22 for further scaling and precoding.

The carrier loading information and carrier scaling information for parsing, mapping and scaling the data sequence $\{s_{m,t}\}$ are denoted as CLm and CSm respectively.

There is seen in FIG. 3 the line termination card 1, and a further line termination card 1' that accommodates a similar VE 20' with N input terminals to $I'_1$ to $I'_N$ and N output terminals $O'_1$ to $O'_N$. The controllers and carrier loading and scaling information have been purposely omitted in FIG. 3 in order to not clutter the drawing.

As an illustrative embodiment, three data output terminals $10_1$, $10_m$ and $10_M$ forming part of three encoders ENC_1, ENC_m and ENC_M respectively, and outputting three data sequences $\{s_{1,t}\}$, $\{s_{m,t}\}$ and $\{s_{M,t}\}$ respectively, are shown. The encoders ENC_1 and ENC_M form part of the line termination card 1, and the outputted data sequences $\{s_{1,t}\}$ and $\{s_{M,t}\}$ are transmitted over subscriber lines $L_1$ and $L_M$ (not shown) connected to the line termination card 1. The encoder ENC_m forms part of the further line termination card 1', and the outputted data sequence $\{s_{m,t}\}$ is transmitted over a subscriber line $L_m$ (not shown) connected to the further line termination card 1'. The lines L1, Lm and LM share the same cable binder, and form part of the same crosstalk compensation group.

The data output terminals $10_1$ and $10_M$ are coupled to the input terminals $I_1$ and $I_N$ of the VE 20 respectively, and are coupled via the first forwarder 40 to the input terminals $I'_1$ and $I'_N$ of the VE 20' respectively. The data output terminal $10_m$ is coupled to the input terminals $I'_n$ of the VE 20', and is coupled via the second forwarder 50 to the input terminal $I_n$ of the VE 20, n denoting an input terminal index of the VE 20 ranging from 1 to N.

The output terminals $O_1$ and $O_N$ of the VE 20 are coupled to IDFT units IDFT_1 and IDFT_M respectively, whereas the output terminal $O_n$ of the VE 20 is left open (such a terminal is terminated with a cross in FIG. 3). The output terminal $O'_n$ of the VE 20' is coupled to an IDFT unit IDFT_m, whereas the output terminal $O'_1$ and $O'_N$ of the VE 20' are left open. The IDFT units IDFT_1, IDFT_m and IDFT_M are further coupled to the lines L1, Lm and LM respectively.

P, which is a N×N square matrix, denotes a precoding matrix for pre-compensating the crosstalk induced over the lines L1, Lm and LM, and is used by both the VEs 20 and 20'. The precoding matrix P is obtained from e.g. a crosstalk estimating unit (not shown).

The data sequences $\{s_{1,t}\}$ and $\{s_{M,t}\}$ are forwarded with the carrier loading parameters $CL_1$ and $CL_M$ and the carrier scaling parameters $CS_1$ and $CS_M$ towards the VE 20' by the first forwarder 40. More specifically, the data sequence $\{s_{1,t}\}$ is forwarded towards the input terminal of the VE 20', and the carrier loading and scaling parameters $CL_1$ and $CS_1$ are forwarded towards the corresponding input control terminal of the VE 20'. The data sequence $\{s_{m,t}\}$ is forwarded towards the input terminal $I'_N$ of the VE 20', and the carrier loading and scaling parameters $CL_m$ and $CS_m$ are forwarded towards the corresponding input control terminal of the VE 20'.

Similarly, the data sequence $\{s_{m,t}\}$ is forwarded together with the carrier loading parameter $CL_m$ and the carrier scaling parameter $CS_m$ towards the VE 20 by the second forwarder 50. more specifically, the data sequence $\{s_{m,t}\}$ is forwarded towards the input terminal $I_n$ of the VE 20, and the carrier loading and scaling information $CL_m$ and $CS_m$ are forwarded towards the corresponding input control terminal of the VE 20.

The signals forming part of the same crosstalk compensation group need to be aligned at the DMT symbol level for them to be jointly processed. Consequently, a common timing reference shall be supplied (e.g., by a central clock distribution unit) to each line termination card, and the operation of each transceiver shall be synchronized with this common timing reference.

Signal forwarding between line termination cards may involve one or more intermediary communication units for forwarding unmapped data sequences and/or related carrier loading and scaling parameters.

As an exemplary embodiment, signal forwarding together with crosstalk channel estimation, line management, and timing and synchronization functions could be merged into one or more crosstalk compensation cards. This card may be installed in a specific slot (e.g., the slot provided for the redundant network termination card; or any other slot with the appropriate connectivity) so that signals from any subscriber line on any line termination card can be sent/receive to/from this card. The crosstalk compensation card maintains information of all the crosstalk compensation groups, and depending on the memberships, selectively relays signals to a collection of line termination cards, which perform joint signal processing on line signals in this group.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the invention, the relevant components of the device are A and B.

It is to be further noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description, and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. when provided by a processor, the functions may be provided by a single dedicated processor, by a single shared processor, or by a plurality of individual processors, some of which may be shared. moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A first line termination card for connecting subscriber devices through subscriber lines, and comprising:
    a data output terminal configured to output a data sequence,
    a vectoring entity configured to parse and encode said data sequence into frequency samples according to a carrier loading parameter, configured to scale said frequency samples into scaled frequency samples according to a carrier scaling parameter, and configured to process said scaled frequency samples for crosstalk compensation,
    a controller configured to adjust said carrier loading parameter and said carrier scaling parameter,
    a forwarder coupled to said data output terminal and to said controller, and configured to forward said data sequence, said carrier loading parameter and said carrier scaling parameter towards a second line termination card, wherein the first and second line termination cards are different line termination cards.

2. A line termination card according to claim 1, wherein said vectoring entity is for further configured to parse and encode a further data sequence into further frequency samples according to a further carrier loading parameter, configured to scale said further frequency samples into further scaled frequency samples according to a further carrier scaling parameter, and configured to process said further scaled frequency samples for crosstalk compensation, and wherein said line termination card further comprises a further forwarder coupled to said vectoring entity and configured to receive said further data sequence, said further carrier loading parameter and said further carrier scaling parameter from said further line termination card.

3. A line termination card according to claim 1, wherein said data sequence is multicast based on membership in a crosstalk compensation group.

4. A line termination card according to claim 1, wherein said carrier loading parameter refers to a carrier bit loading as determined during the initialization or operation of a data communication path over a subscriber line.

5. A line termination card according to claim 1, wherein said carrier loading parameter refers to a carrier ordering table as determined during the initialization or operation of a data communication path over a subscriber line.

6. A line termination card according to claim 1, wherein said carrier scaling parameter refers to a relative carrier gain as determined during the initialization or operation of a data communication path over a subscriber line.

7. A line termination card according to claim 1, wherein said carrier scaling parameter refers to a transmit power spectral mask as configured over a subscriber line.

8. An access node comprising a line termination card according to claim 1.

9. An access node according to claim 8, wherein said access node is a Digital Subscriber Line Access Multiplexer or DSLAM.

10. A method for connecting subscriber devices through subscriber lines, and comprising by a first line termination card:
    outputting a data sequence,
    parsing and encoding said data sequence into frequency samples according to a carrier loading parameter,
    scaling said frequency samples into scaled frequency samples according to a carrier scaling parameter,
    processing said scaled frequency samples for crosstalk compensation, adjusting said carrier loading parameter and said carrier scaling parameter, forwarding said data sequence, said carrier loading parameter and said carrier scaling parameter towards a second line termination card, wherein the first and second line termination cards are different line termination cards.

\* \* \* \* \*